(12) United States Patent
Zwick

(10) Patent No.: US 6,595,488 B2
(45) Date of Patent: Jul. 22, 2003

(54) BUTTERFLY VALVE

(75) Inventor: Johann Zwick, Ennepetal (DE)

(73) Assignee: Zwick GmbH, Ennepetal (DE)

( * ) Notice: Subject to any disclaimer, the term of this patent is extended or adjusted under 35 U.S.C. 154(b) by 0 days.

(21) Appl. No.: 09/766,508

(22) Filed: Jan. 19, 2001

(65) Prior Publication Data

US 2002/0134960 A1 Sep. 26, 2002

(51) Int. Cl.[7] .................................. F16K 1/22
(52) U.S. Cl. ...................... 251/214; 251/306; 251/308
(58) Field of Search ........................... 251/308, 214, 251/305, 306, 307

(56) References Cited

U.S. PATENT DOCUMENTS

| | | | |
|---|---|---|---|
| 3,778,028 A | * 12/1973 | Graves et al. | 251/306 |
| 3,905,577 A | * 9/1975 | Karpenko | 251/306 |
| 3,991,974 A | * 11/1976 | Bonafous | 251/214 |
| 4,217,923 A | * 8/1980 | Kindersley | 251/214 |
| 4,291,863 A | * 9/1981 | Gachot | 251/308 |
| 4,759,530 A | * 7/1988 | Iff | 251/214 |

* cited by examiner

Primary Examiner—Gene Mancene
Assistant Examiner—John Bastianelli
(74) Attorney, Agent, or Firm—Goodman + Teitelbaum, Esqs.

(57) ABSTRACT

A butterfly valve for a media under high pressure and/or at high temperature including a housing provided with a passage for the medium, a butterfly arranged as a shut-off member within the passage, and a shaft guided at both ends in two pivot bearings so that the shaft extends transversely through the passage and out of the housing. The butterfly, by the shaft, is pivotable about an axis of rotation so that in an opened position, a disk plane of the butterfly extends approximately in a direction of the passage, and in a closed position, with the butterfly lying transversely to the passage direction, the butterfly interacts with a sealing seat on the housing to provide a circumferential seal.

9 Claims, 3 Drawing Sheets

FIG. 1
FIG. 2
FIG. 3
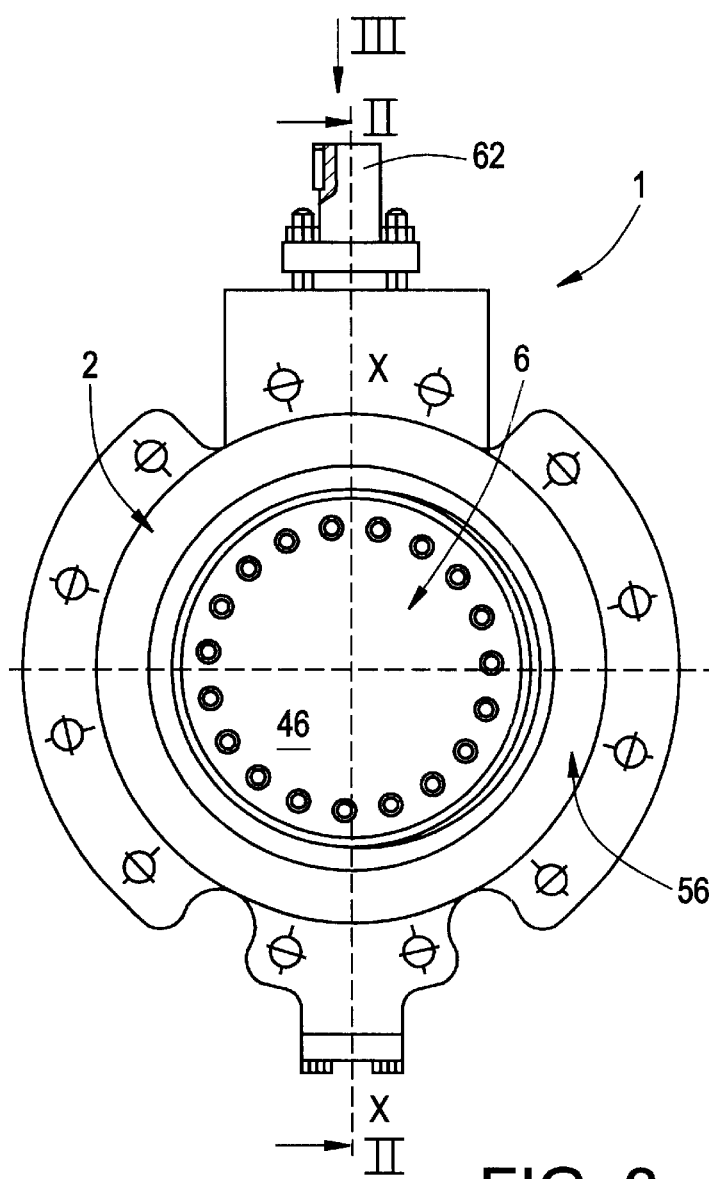
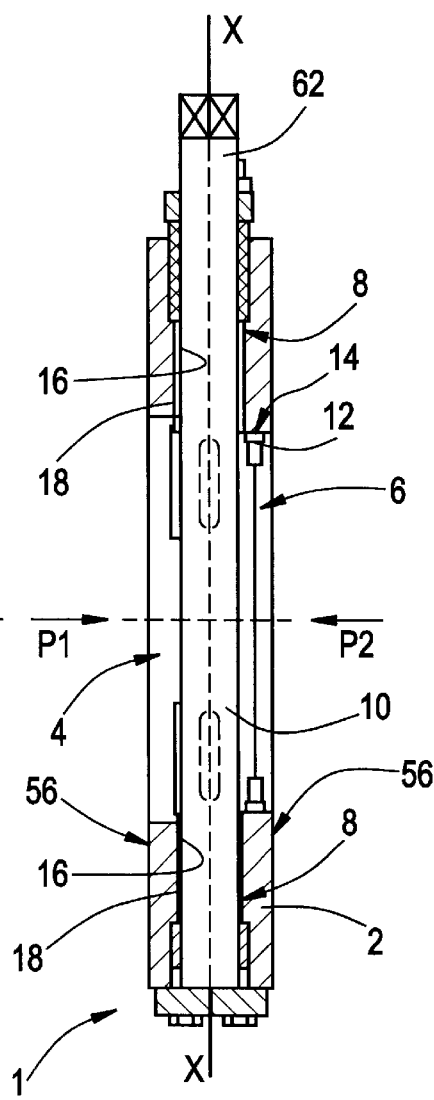
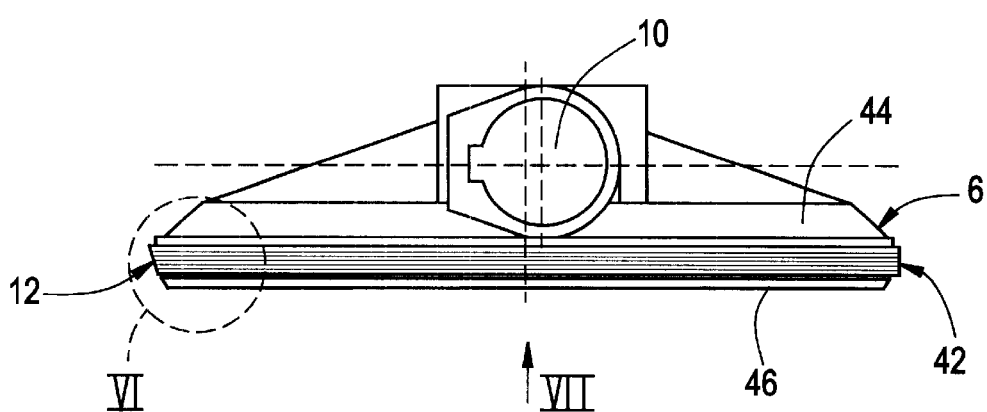

BUTTERFLY VALVE

BACKGROUND OF THE INVENTION

The present invention relates to a butterfly valve for media under high pressure and/or at high temperature, consisting of a housing with a passage for the medium and of a butterfly arranged as a shut-off member within the passage and, via a shaft guided at both ends in pivot bearings on the housing, extending transversely through the passage and guided on one side by an actuating end out of the housing to the exterior, pivotable about an axis of rotation in such a way that, in an opened position, its disk plane extends approximately in the direction of the passage and in a closed position, lying transversely to the passage direction, it interacts with a sealing seat on the housing to form a circumferential seal, an advance bearing seal being arranged in front of each of the two pivot bearings on its inner side facing the passage in such a way that an annular gap surrounding the shaft in the region of the respective pivot bearing is sealed off against penetration of medium from the passage.

Such valves are used as shut-off members in high-pressure systems, for example between pipe work sections, pressure vessels, boilers, turbines and/or the like. Customarily, in such cases, an extensive sealing zone of the butterfly and the circumferential sealing seat on the housing are of "conical" design, by way of adaptation to the closing and opening movements of the butterfly, so that, in the closed position, the butterfly is pressed firmly into the sealing seat in the event of the action of pressure from the side on which the shaft extends. As a result, an effective seal is guaranteed even under very high pressure, and at the same time the butterfly is also mechanically supported against the pressure. In practice, however, such valves are generally designed for both directions of flow, so that the reverse case of loading also often arises, the butterfly being subjected to the action of a counter-pressure on its side facing away from the shaft.

In earlier known valves, it has proven in practical use that functional problems may arise with certain media in that, after a certain time, the butterfly becomes almost or even completely impossible to actuate.

In a butterfly valve of the generic type described in DE-U-298 22 791, therefore, provision is made for each of the two pivot bearings on the housing to have a statically compressed advance bearing seal between the shaft and the housing in its inner end region facing the passage. The intention here is to prevent the respective pressurized medium from penetrating from the passage into the region of the pivot bearings, in other words, in each case, into an annular gap between the shaft and bearing hole in the housing. This measure is based on the finding that it is precisely this kind of penetration by certain media into the region of the pivot bearings that causes the problems described. In particular, polymerizing media (known as "crack media"), such as hydrocarbon and certain resins, may cause deposits, especially in the form of crystals, and so result in seizing of the shaft in the pivot bearings. The intention is to prevent this by means of the advance bearing seal, the media not being able to penetrate into the region of the pivot bearings in the first place. However, it has been found that such problems may still occur after extended periods of use.

BRIEF SUMMARY OF THE INVENTION

It is an object of the present invention further to improve a butterfly valve of the generic type so that, even after extended periods of use, and use for any desired media, problem-free functioning for the opening and closure of the passage can always be guaranteed.

This is achieved, according to the invention, in that (at least) the advance bearing seal lying remote from the actuating end of the shaft can be axially subjected via tensioning means to the effect of a retensioning force such that a subsequent radial compressibility is achieved. Preferably, the other advance bearing seal lying closer to the shaft actuating end can also be acted upon via tensioning means for retensioning. It is particularly advantageous here for the tensioning means to be formed by spring means, in such a way that the, or each, advance bearing seal is permanently subjected to the action of spring force in the axial direction, so that a continuous self-adjusting radial compression is achieved.

The invention is based on the finding that, in the known, generic butterfly valve, the material qualities of the graphite gaskets and/or (carbon) fiber meshings used in the region of the advance bearing seals, after extended use under high pressure and/or at high temperature, may be affected by settling phenomena such that a static sealing compression existing there, previously predetermined by means of screw connections may slacken. It is admittedly possible in principle, in the known butterfly valve, for the advance bearing seal lying closer to the actuating end of the shaft to be retensioned via screw connections. However, this not only requires maintenance work, though work whose necessity cannot be perceived at all from outside, but also the other advance bearing seal is tensioned exclusively statically, via a housing lid, and therefore cannot be retensioned at all, even by maintenance. This can result in a lack of tightness of both advance bearing seals, though particularly of the advance bearing seal lying remote from the actuating end of the shaft, as a result of which the medium concerned can again penetrate into the area of the pivot bearings and cause the problems described initially.

By contrast, what is achieved by the invention is that both advance bearing seals can now be retensioned, at least by maintenance work. In the preferred embodiment, in which spring means are provided as tensioning means, automatic self-adjustment of the sealing compression is advantageously achieved in that the spring means subject the advance bearing seals to virtually constant spring force at all times and so brace them permanently. As a result, a virtually maintenance-free butterfly valve with a long service life is provided. In addition, the further advantage arises that, because the advance bearing seal is maintained over a long period, the axial application of force to the shaft, caused by pressure is avoided, because the pressure medium is kept away from a space in which the end of the shaft opposite an actuating end is virtually encapsulated; this space is advantageously kept free of pressure by the effective, self-adjusting advance bearing seal.

In a preferred embodiment of the invention, it is envisaged that each advance bearing seal has a two-part bearing bush with an inner bush directly receiving the shaft and an outer bush receiving the inner bush and seated in a bearing hole in the housing. In this case, a compressible sealing element is arranged in the inner end region, in other words the end region facing the passage, of the respective pivot bearing, axially between the inner bush and a projecting end section of the outer bush in the form of an annular web, so that, as a result of the axial compression of the bearing bush—or of the inner bush and the outer bush relative to one another—the sealing element is also radially compressed and continuously inwardly compressed against the shaft by the spring force according to the invention. This preferred embodiment represents a particular advantage in terms of the assembly of the butterfly valve. The shaft can first be easily mounted by simply being pushed into the pivot bearings—preferably formed by the respective two-part bearing bushes. Only after this assembly are the advance bearing seals then braced by axial compression of the bearing bushes by the spring means.

Further advantageous design features of the invention are contained below in the description that follows.

BRIEF DESCRIPTION OF THE DRAWINGS

The invention will be explained in detail below, with reference to a preferred example of embodiment shown in the drawings, in which:

FIG. 1 shows a front view of a butterfly valve according to the invention in the closed position of the counter-pressure side, FIG. 2 shows an axial section in the plane of section II—II in FIG. 1, a conventional, known embodiment being illustrated in this case, FIG. 3 shows a separate and enlarged view of the butterfly in the axial direction, in other words in the direction of the arrow III according to FIG. 1.

In the various figures of the drawing, identical parts are always provided with identical reference numbers and are therefore, in general, also only described once.

DETAILED DESCRIPTION OF THE INVENTION

Figure 4:
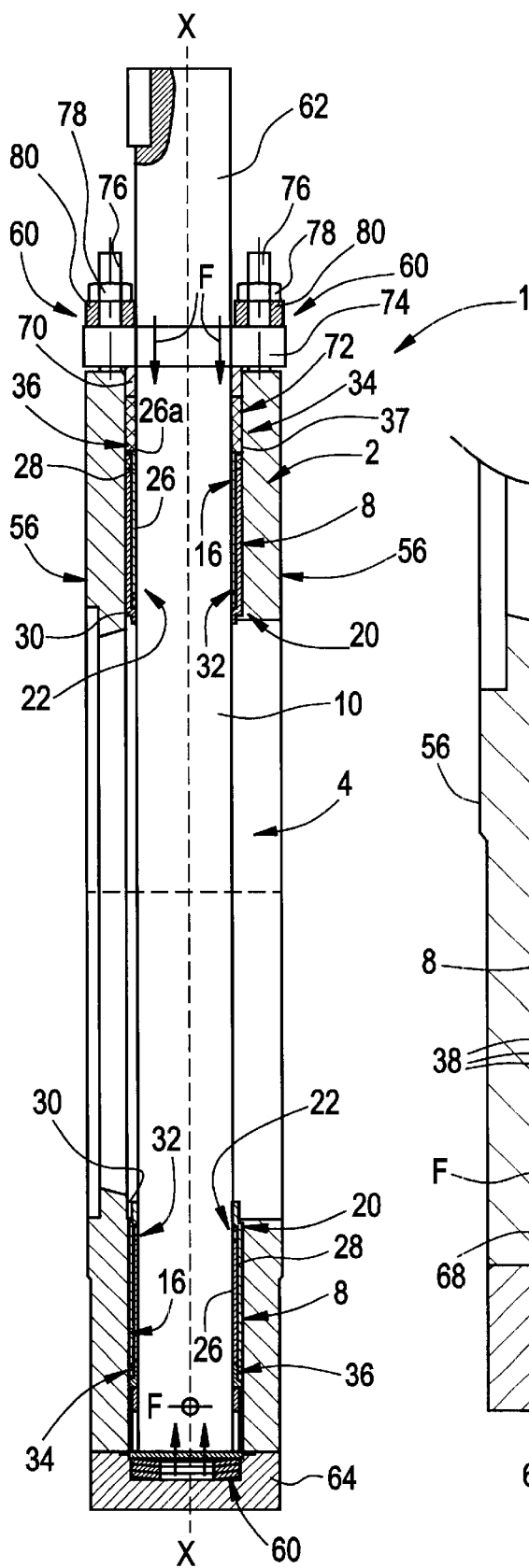
FIG. 4 shows a simplified and enlarged view analogous to FIG. 2 in an embodiment according to the invention.

A butterfly valve 1 according to the invention consists of a housing 2 with a passage 4 (cf. FIGS. 2 and 4) for a medium and of a substantially circular butterfly 6 arranged as a shut-off member within the passage 4. This butterfly 6 can be twisted or—more accurately—pivoted, via a shaft 10 arranged on one side of the disk, guided at both ends in pivot bearings 8 on the housing and extending transversely through the passage 4, about an axis X—X of rotation extending substantially diametrically relative to its circular shape, in such a way that, in an opened position (not shown in the drawing), it extends with its disk plane approximately in line with the direction of the passage or approximately parallel thereto and, in the closed position shown in FIGS. 1 and 2, transverse to the direction of the passage, and closing the passage 4, which interacts sealingly, by means of an outer, circumferential sealing zone 12, with a circumferential sealing seat 14 on the housing. This is best apparent from FIG. 2.

In the conventional embodiment illustrated in FIG. 2, it is apparent that annular gap 18 is formed in the region of each pivot bearing 8, in each case between the shaft 10 and an associated bearing hole 16, into which a pressurised medium might penetrate from the region of the passage 4 and, possibly solidify there.

Figure 5:
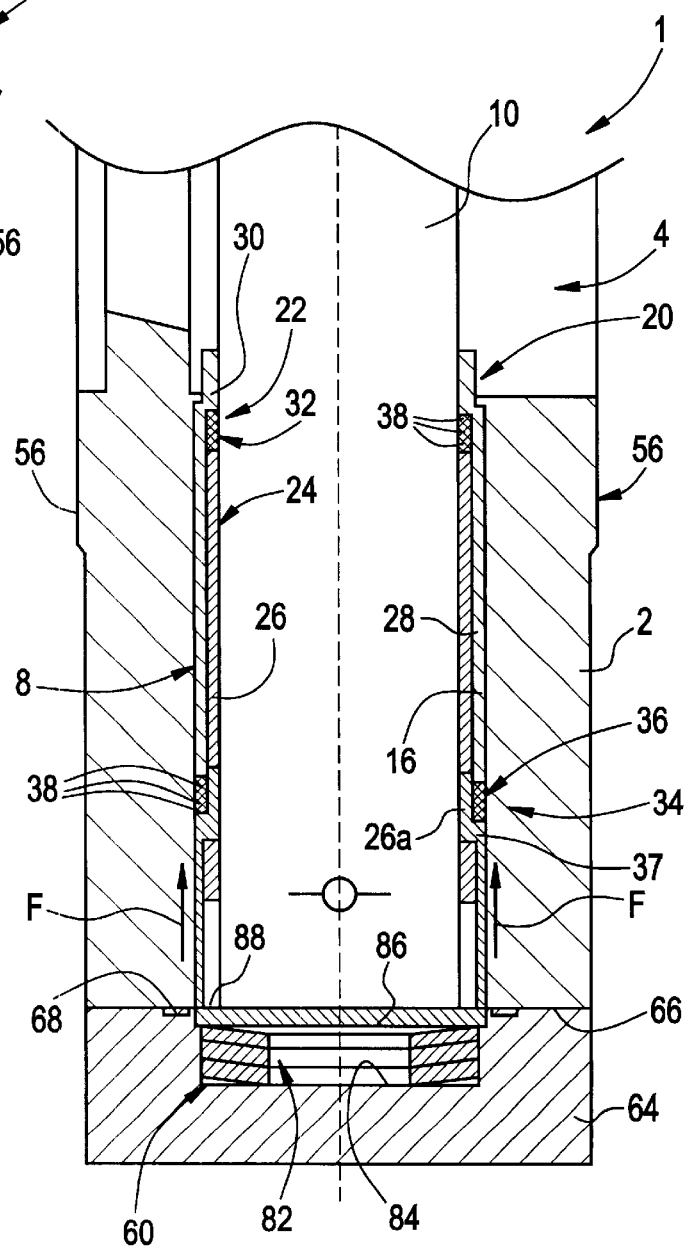
FIG. 5 shows an enlarged section of the region of the lower pivot bearing in FIG. 4.
Figure 6:
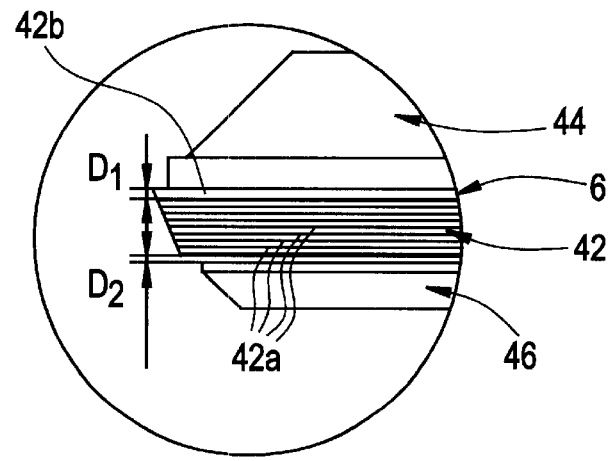
FIG. 6 shows an enlarged detailed view of the area VI in FIG. 3.

In order to prevent this, provision is made, according to FIGS. 4 and 5, for each of the two pivot bearings 8 to have a compressible advance bearing seal 22 between the shaft 10 and the housing 2 on its inner side 20 facing the passage 4. To this end, expediently, each advance bearing seal 22 has a two-part bearing bush 24 with an inner bush 26 receiving the shaft 10 and supporting it directly and an outer bush 28 receiving the inner bush 26 and seated in the respective bearing hole 16 of the housing 2. These two bushes 26, 28 are seated one within the other so as to be axially displaceable. On the inner side 20 of each bearing 8, a compressible sealing element 32 is arranged axially between the inner bush 26 and a projecting end section 30, extending radially inward beyond the end face of the inner bush 26, of the outer bush 28 (see FIG. 5) in such a way that, by axial compression or bracing of the bearing bush 24—or of the inner and outer bushes 26, 28 relative to one another—the sealing element 32 is also radially compressed between the outer bush 28 and the shaft 10. As a result, the annular gap between the shaft 10 and the bearing bush 24 is sealed on the side of the passage 4, so that penetration of the respective medium into the annular gap surrounding the shaft 10 is prevented.

Preferably, each pivot bearing 8 also has, on its side 34 remote from the passage 4, a second, outer sealing element such that this second sealing element 36 is also radially compressed outward against the bearing hole 16 of the housing 2 by the axial compression of bearing bush 24 previously described above. For this purpose, the sealing element 36 is seated axially between the outer bush 28 and a section 37 of the inner bush 26 or of a separate pressure bush 26a projecting radially outwards beyond the end face of the outer bush 28.

As is best apparent in FIG. 5, at least the first, inner sealing element 32 of each advance bearing seal 22 is formed by a pack of gaskets with at least two compressible gaskets 38. In particular, the two inner sealing elements 32 preferably consist of a 3-part pack of sealing rings comprising three compressible gaskets 38, which are preferably pre-pressed pure graphite rings. Each outer sealing element 36 preferably consists of an identical gasket pack of three gaskets 38.

As is now additionally apparent, especially from FIGS. 2, 3, 6 and 7, the sealing seat 14 on the housing and the sealing zone 12 of the butterfly 6 are designed, at least in a partial region of their circumference, with a conical taper to adapt them to the closing pivot movement of the butterfly 6, so that the free flow cross section in the region of the sealing seat 14 narrows slightly, especially in the direction of the butterfly 6 opposite to the shaft side. As a result of this, the shaft side of the butterfly 6 is the pressure side, which can be subjected to a pressure $p_1$. The side of the butterfly 6 remote from the shaft 10 is known as the counter-pressure side, and can be subjected to a pressure $p_2$. When pressure $p_1$ is applied—or when $p_1$ is greater than $p_2$—the butterfly 6 is pressed into the sealing seat 14. When a high counter-pressure $p_2$ is applied (or $p_2$ is greater than $p_1$) the butterfly 6 is supported by the shaft 10 against being lifted off the sealing seat 14.

Figure 7:
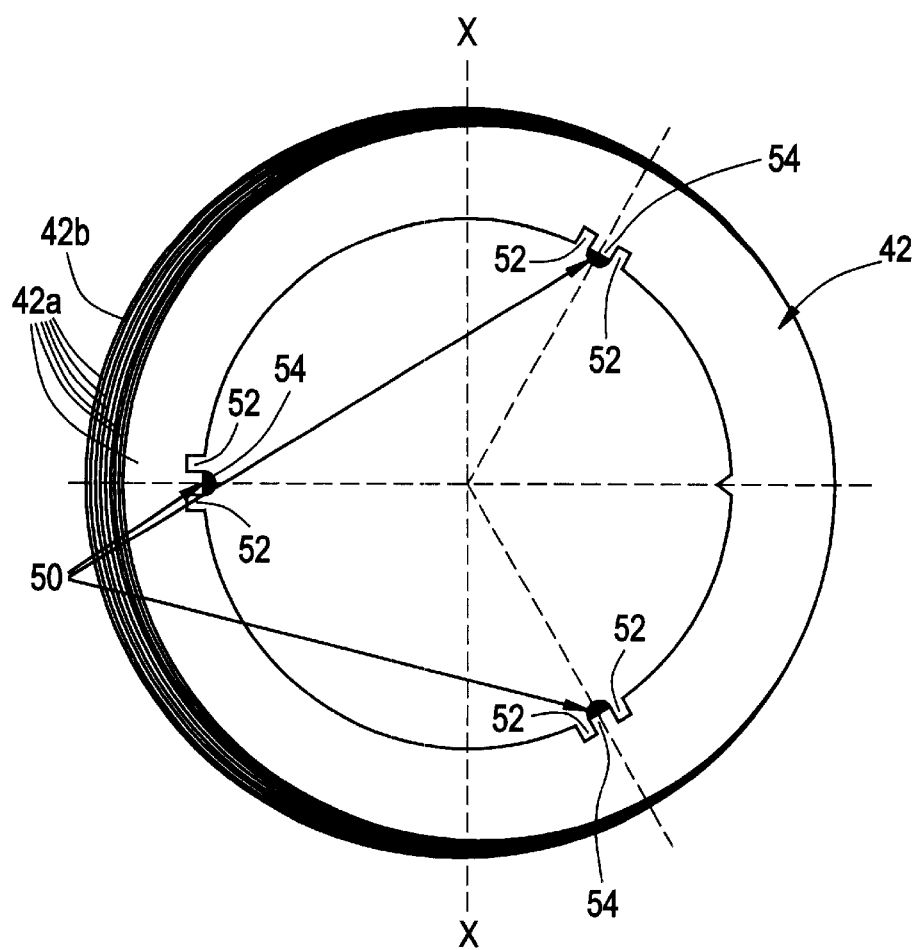
FIG. 7 shows a separate view of the sealing ring of the butterfly in the direction of the arrow VII in FIG. 3.

The sealing zone 12 of the butterfly 6 is formed by a separate sealing ring 42, which is shown separately in FIG. 7. This sealing ring 42 is held clamped between a base disk 44 of the butterfly 6 and a clamping element 46 which is especially distoidal but may also be in the form of a annual disk (see FIGS. 3 and 6). In this case, provision is preferably made for the sealing ring 42, as a segment seal, to consist of a plurality of individual seal (stainless steel) disks 42a, 42b stacked one on top of the other. Regarding the pressure conditions described above, it is advantageous here if the first individual disk 42b of the segment seal 42 arranged on one side, especially on the pressure side $p_1$, has a thickness $D_1$ which is greater than the thickness $D_2$ of the other individual disks 42a—in this connection, see FIG. 6. For example, the thickness $D_1$ of the first disk 42b may be approximately 1 mm, while the thickness $D_2$ of all other disks 42a is, for example, about 0.5 mm.

As is also apparent from FIG. 7, the individual disks 42a,b in the inner circumferential region of the sealing ring 42 are bonded, especially welded, together at, preferably three or more connecting points 50 uniformly distributed over the circumference of the ring. For this purpose, approximately radially aligned tongues 54 are in each case formed by incisions 52 on both sides, the welding taking place only in the regions of the tongues 54 in order to avoid thermally induced distortions of the disks.

In an alternative embodiment (not shown), the individual disks 42a,b may also be pinned or riveted together in their annular surface region.

In each case, care must be taken to ensure that the two end surfaces of the rings are machined flat to enable them to be clamped between the base disk and the clamping element 46.

It should additionally be mentioned that the housing 2 is designed substantially as a hollow cylinder, because of the relatively short flow length, alternatively as an annular disk. In this case, the housing 2 has two opposite end sealing surfaces 56 which can be flanged to corresponding counter-sealing surfaces of particular pressure system components (not shown), such as pipeline sections, pressure vessels, boilers, turbines and the like.

In the preferred embodiment of the invention shown, each advance bearing seal 22 is permanently subjected in the axial direction to a spring force F by spring means 60 so that a continuous, self-adjusting radial compression is achieved.

In the embodiment shown, the shaft 10 is guided out of the housing 2 to the exterior at one end, by an actuating end 62. At the other end, the shaft 10 ends in a housing space sealing closed by a lid element 64. The lid element 64 is screwed flat against a housing surface 66, for example by means of four screw elements unidentifiable in FIGS. 4 and 5. The sealing is carried out by means of a gasket 68, which is preferably designed as a graphite spiral lid seal and accommodated in an annular recess, especially in the lid element 64.

The (upper) advance bearing seal 22 lying nearing the actuating end of the shaft 10 is subjected to the action of the spring force F via a sleeve-shaped stuffing box element 70 enclosing the shaft 10 and engaging into the housing 2 in some areas. Preferably, the stuffing box element 70 acts against the inner bush 26 of the two-part bearing bush 24, especially via an additional sealing packing 72, which is seated in the annular gap immediately between the shaft 10 and the bearing hole 16, and preferably via a separate pressure bush 26a. The stuffing box element 70 is subjected here to the action of a pressure member 74, which is seated outside the housing 2 on stud bolts 76 connected to the housing 2 and parallel to the shaft 10. The pressure member 74 has a central aperture for the shaft 10. A spring means 60, at least one compression spring element 80, which is especially designed as a spring assembly consisting of a plurality of disk springs to generate the relatively high spring force F necessary for prestressing, is seated on each stud bolt 76 between the pressure member 74 and an abutment element 78 opposite the housing 2. The stud bolts 76 may advantageously be designed as threaded bolts, and the abutment elements 78 as threaded nuts fitting the latter. As a result, the spring prestress F can be preset. Expediently, four stud bolts 76 with corresponding pressure spring elements 80 and abutment elements 78 are provided in a force-symmetrical distribution around the shaft 10.

As can best be seen from the enlarged view in FIG. 5, the other advance bearing seal 22, arranged on the closed side of the housing 2, is subjected to the action of at least one compression spring 82 acting as a spring means 60 between the lid element 64 and the inner bush 26 of the two-part bearing bush 24. This compression spring 82 also is preferably a spring assembly consisting of a plurality of disk springs in order to be able to apply the necessary, quite high prestressing spring force F. In this case, the compression spring 82 is seated in an inner receiving recess 84 of the lid element 64 and acts, especially via a discoid pressure element 86, on the bearing bush 24 or, via the preferably available pressure bush 26a, on the inner bush 26. The pressure element 86 can advantageously be seated without play in a recess of the lid element 64 and have a centring shoulder 88 engaging substantially without play into the bearing bush. As a result, automatic centring of the lid element 64 relative to the housing 2 is achieved during assembly.

The invention is not confined to the examples of the embodiment shown and described, but encompasses all embodiments of equivalent effect within the meaning of the invention. Furthermore, the invention is also not yet confined to the combination of features defined above but can also be defined by any other desired combination of particular features of all disclosed individual features. This means that, in principal, virtually any above individual feature of the invention can be omitted or replaced by at least one individual feature disclosed elsewhere in the application. To this extent, the present invention is to be understood merely as a first attempt at formulating an invention.

I claim:

1. A butterfly valve (1) for a media under high pressure and/or at high temperature, comprising:

a housing (2) provided with a passage (4) for the medium, a butterfly (6) arranged as a shut-off member within the passage (4), a shaft (10) guided at both ends in two pivot bearings (8) provided on the housing (2), the shaft (10) extending transversely through the passage (4) and being guided on one side, by an actuating end (62), out of the housing (2) to the exterior, the butterfly (6), by the shaft (10), being pivotable about an axis (X—X) of rotation in such a way that, in an opened position, a disk plane of the butterfly (6) extends approximately in a direction of the passage (4), and in a closed position, with the butterfly (6) lying transversely to the passage direction, the butterfly (6) interacts with a sealing seat (14) on the housing (2) to provide a circumferential seal, an advance bearing seal (22) being arranged in front of each of the two pivot bearings (8) on an inner side (20) thereof facing the passage (4) in such a way that an annular gap (18) surrounding the shaft (10) in a region of each respective pivot bearing (8) is sealed off against penetration of the medium from the passage (4), one advance bearing seal (22), lying remote from the actuating end (62) of the shaft (10), being axially subjected via tensioning means to provide a retensioning force so that a subsequent radial compressibility is achieved, each advance bearing seal (22) having a two-part bearing bush (24) provided with an inner bush (26) for receiving the shaft (10) therein, an outer bush (28) for receiving the inner bush (26) therein, and each advance bearing seal (22) being seated in a bearing hole (16) in the housing (2), a compressible sealing element (32) being arranged on the inner side (20) of each respective pivot bearing (8), the sealing element (32) being axially disposed between the inner bush (26) and a projecting end section (30) of the outer bush (28), so that, as a result of an axial compression of the bearing bush (24), the sealing element (32) is also radially compressed against the outer bush (28) and inwardly compressed against the shaft (10) to be compressed between the outer bush (28) and the shaft (10).

2. A butterfly valve as claimed in claim 1, wherein each pivot bearing (8) has, on a side (34) thereof remote from the passage (4), an external second sealing element (36), so that the second sealing element (36), by axial compression of the bearing bush (24), is also radially compressed outward against the bearing hole (16) in the housing (2).

3. A butterfly valve as claimed in claim 1, wherein at least the compressible sealing element (32) of each advance bearing seal (22) is provided by a gasket pack with at least two compressible gaskets (38) fabricated from pre-pressed pure graphite.

4. A butterfly valve (1) for a media under high pressure and/or at high temperature, comprising:

a housing (2) provided with a passage (4) for the medium, a butterfly (6) arranged as a shut-off member within the passage (4), a shaft (10) guided at both ends in two pivot bearings (8) provided on the housing (2), the shaft (10) extending transversely through the passage (4) and being guided on one side, by an actuating end (62), out of the housing (2) to the exterior, the butterfly (6), by the shaft (10), being pivotable about an axis (X—X) of rotation in such a way that, in an opened position, a disk plane of the butterfly (6) extends approximately in a direction of the passage (4), and in a closed position, with the butterfly (6) lying transversely to the passage direction, the butterfly (6) interacts with a sealing seat (14) on the housing (2) to provide a circumferential seal, an advance bearing seal (22) being arranged in front of each of the two pivot bearings (8) on an inner side (20) thereof facing the passage (4) in such a way that an annular gap (18) surrounding the shaft (10) in a region of each respective pivot bearing (8) is sealed off against penetration of the medium from the passage (4), one advance bearing seal (22), lying remote from the actuating end (62) of the shaft (10), being axially subjected via tensioning means to provide a retensioning force so that a subsequent radial compressibility is achieved, each advance bearing seal (22) having a two-part bearing bush (24) provided with an inner bush (26) for receiving the shaft (10) therein, an outer bush (28) for receiving the inner bush (26) therein, and each advance bearing seal (22) being seated in a bearing hole (16) in the housing (2), another advance bearing seal (22) lying closer to the shaft actuating end (62) and being subjected to an action of the tensioning means by a sleeve-shaped stuffing box element (70) enclosing the shaft (10), by an additional seal packing (72) and by the inner bush (26) of the bearing bush (24), the stuffing box element (70) being subjected to action of a pressure member (74) which has an aperture through which the shaft (10) engages, the pressure member (74) being seated on a stud bolt (76) connected to the housing (2), and at least one compression spring element (80), which includes a spring assembly having a plurality of disk springs, being seated on the stud bolt (76), in each case the spring element (80) being disposed between the pressure member (74) and an abutment element (78), as a tensioning or spring means (60).

5. A butterfly valve as claimed in claim 4, wherein each stud bolt (76) is a threaded bolt and each abutment element (78) is a threaded nut.

6. A butterfly valve as claimed in claim 4, wherein four stud bolts (76) are provided, with corresponding compression spring elements (80) and abutment elements (78), in a force-symetrical arrangement.

7. A butterfly valve (1) for a media under high pressure and/or at high temperature, comprising:

a housing (2) provided with a passage (4) for the medium, a butterfly (6) arranged as a shut-off member within the passage (4), a shaft (10) guided at both ends in two pivot bearings (8) provided on the housing (2), the shaft (10) extending transversely through the passage (4) and being guided on one side, by an actuating end (62), out of the housing (2) to the exterior, the butterfly (6), by the shaft (10), being pivotable about an axis (X—X) of rotation in such a way that, in an opened position, a disk plane of the butterfly (6) extends approximately in a direction of the passage (4), and in a closed position, with the butterfly (6) lying transversely to the passage direction, the butterfly (6) interacts with a sealing seat (14) on the housing (2) to provide a circumferential seal, an advance bearing seal (22) being arranged in front of each of the two pivot bearings (8) on an inner side (20) thereof facing the passage (4) in such a way that an annular gap (18) surrounding the shaft (10) in a region of each respective pivot bearing (8) is sealed off against penetration of the medium from the passage (4), one advance bearing seal (22), lying remote from the actuating end (62) of the shaft (10), being axially subjected via tensioning means to provide a retensioning force so that a subsequent radial compressibility is achieved, a sealing zone (12) of the butterfly (6) being provided with a sealing ring (42), which is clamped between a base disk (44) of the butterfly (6) and a discoid or annular disk-shaped clamping element (46), the sealing ring (42) being a segment seal of individual steel disks (42a,b) placed one upon another as a pack, and the individual steel disks (42a,b) being connected to each other by bonding in an inner circumferential region of the sealing ring (42) by welding at a minimum of at least three connection points (50).

8. A butterfly valve (1) for a media under high pressure and/or at high temperature, comprising:

a housing (2) provided with a passage (4) for the medium, a butterfly (6) arranged as a shut-off member within the passage (4), a shaft (10) guided at both ends in two pivot bearings (8) provided on the housing (2), the shaft (10) extending transversely through the passage (4) and being guided on one side, by an actuating end (62), out of the housing (2) to the exterior, the butterfly (6), by the shaft (10), being pivotable about an axis (X—X) of rotation in such a way that, in an opened position, a disk plane of the butterfly (6) extends approximately in a direction of the passage (4), and in a closed position, with the butterfly (6) lying transversely to the passage direction, the butterfly (6) interacts with a sealing seat (14) on the housing (2) to provide a circumferential seal, an advance bearing seal (22) being arranged in front of each of the two pivot bearings (8) on an inner side (20) thereof facing the passage (4) in such a way that an annular gap (18) surrounding the shaft (10) in a region of each respective pivot bearing (8) is sealed off against penetration of the medium from the passage (4), one advance bearing seal (22), lying remote from the actuating end (62) of the shaft (10), being axially subjected via tensioning means to provice a retensioning force so that a subsequent radial compressibility is achieved, a sealing zone (12) of the butterfly (6) being provided with a sealing ring (42), which is clamped between a base disk (44) of the butterfly (6) and a discoid or annular disk-shaped clamping element (46), the sealing ring (42) being a segment seal of individual steel disks (42a,b) placed one upon another as a pack, and a first individual disk (42b) of the segment seal (42) being arranged on a pressure side thereof and having a thickness ($D_1$), which is greater than a thickness ($D_2$) of a second individual disk (42a).

9. A butterfly valve as claimed in claim 8, wherein the first and second individual disks (42a,b) are pinned or riveted together in an annular surface region thereof.

* * * * *